United States Patent
Chang

(10) Patent No.: US 6,720,700 B2
(45) Date of Patent: Apr. 13, 2004

(54) MOTOR STATOR FOR A HOME ELECTRIC FAN

(75) Inventor: Fang-Pu Chang, Taipei (TW)

(73) Assignee: Kuen Yang Industrial Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/384,523

(22) Filed: Mar. 11, 2003

(65) Prior Publication Data

US 2004/0027025 A1 Feb. 12, 2004

(30) Foreign Application Priority Data

Aug. 8, 2002 (TW) .................................. 91212290 U

(51) Int. Cl.⁷ ................................................ H02K 1/00
(52) U.S. Cl. ........................................ 310/216; 310/254
(58) Field of Search ................................ 310/216, 217, 310/218, 254, 258, 259

(56) References Cited

U.S. PATENT DOCUMENTS

| | | | | |
|---|---|---|---|---|
| 3,942,055 A | * | 3/1976 | Hoffmeyer | 310/216 |
| 4,453,097 A | * | 6/1984 | Lordo | 310/154.07 |
| 4,812,695 A | * | 3/1989 | Parshall | 310/258 |
| 4,831,301 A | * | 5/1989 | Neumann | 310/216 |
| 4,912,353 A | * | 3/1990 | Kondo et al. | 310/259 |
| 5,911,453 A | * | 6/1999 | Boyd et al. | 29/596 |

* cited by examiner

*Primary Examiner*—Dang Le
(74) *Attorney, Agent, or Firm*—Bacon & Thomas

(57) ABSTRACT

A motor stator for a home electric fan includes a plurality of laminated silicon steel sheets respectively provided with a center hole of a larger diameter than the conventional motor stator for a home electric fan for a larger rotor to fit therein. The coil grooves around the center hole are increased from 16 of the conventional one to 24, with the poles of the motor also increased from four to six so as to reinforce the torque for better performance. At the same time the coil grooves are reduced in their dimensions in contrast to the enlarged center hole, reducing the rings of each coil. Therefore the cost for the material is diminished and the temperature to be raised may be lessened, but the effectiveness may be heightened.

2 Claims, 4 Drawing Sheets

MOTOR STATOR FOR A HOME ELECTRIC FAN

BACKGROUND OF THE INVENTION

1. Field of the Invention

This invention relates to a motor stator for a home electric fan, particularly to one reduced in its material used for the coil, and elevated in torque output and effectiveness of the whole motor.

2. Description of the Prior Art

A conventional home electrical fan (including an air exhausting fan, a cool fan, etc.) generally has a motor of a mouse-cage style stator for rotating a fan. The stator of the motor has structure shown in FIG. 1, consisting of a plurality of laminated silicon steel sheets 3 of the length and the width both 75 mm bored with a center hole 31 of a diameter 44 mm and a plurality of coil grooves 32 provided spaced apart around the center hole 31. FIG. 2 shows an upper view of the conventional motor stator 30 after combined with a rotor 5 located in the center hole 31 of the silicon steel sheets 3. Then the coils 4 are powered to produce a magnetic field to rotate the rotor 5 and subsequently rotate the fan. The specification of the conventional home electric fan with a four pole motor having 16 coil grooves has been made by makers for a long time, and still making up a main stream of conventional home electric fans.

Nevertheless, the conventional home electric fan always produces high temperature in operation, which seems to be caused by a large resistance of the copper coil, iron loss caused by reluctance loss, and excess current loss caused by magnetic field cutting after the motor is powered. These elements gives rise to the high temperature of the motor, and directly affects the output effectiveness of the motor.

An U.S. patent application of Ser. No. 09/527,884 filed on Mar. 12, 2000 has disclosed a motor stator for a hole electric fan designed to offer an improved motor stator having a plurality of silicon steel sheets having a center hole enlarged to 48 mm for an enlarged rotor to fit therein so as to try to lower the starting current of the motor, the temperature, the weight and the cost, but to elevate the effectiveness.

However, in realistic application, the best rotation rate of the motor rotor for a home electric fan is 950 rpm, far less than 1600 rpm (the standard of the conventional motor for a home electric fan), and too high speed of the rotation involves difficulty in realistic appliance and design of the motor for a home electric fan. As the conventional four-pole stator for the conventional motor for a home electric fan has a restriction of the coil grooves being 16 and the gap between the stator and the rotor so that the size of the center hole of the stator is impossible to be enlarged so as to meet the needed torque, potential reduction of the rotation rate by external condition such as a reversal wind, or unsmooth rotation of the motor rotor, which the U.S. patent application of Ser. No. 09/527,884 also has. Therefore, it has been a target for makers to offer a home electric fan having the needed rotation, high torque and low temperature.

SUMMARY OF THE INVENTION

This invention has been devised to offer a motor stator for a home electric fan, which has a plurality of laminated silicon steel sheets provided with a center hole of a larger size than that of the silicon steel sheets of a conventional motor stator for a home electric fan so that more coil grooves may be formed to increase the poles of the motor stator from four to six in order to meet realistic need and to strengthen torque for better operation.

The feature of the invention is the coil grooves being reduced in its size in contrast to the center hole enlarged so that the rings of the coil may be reduced and thus reducing the material needed for the coil and its rising temperature, and elevating its effectiveness.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
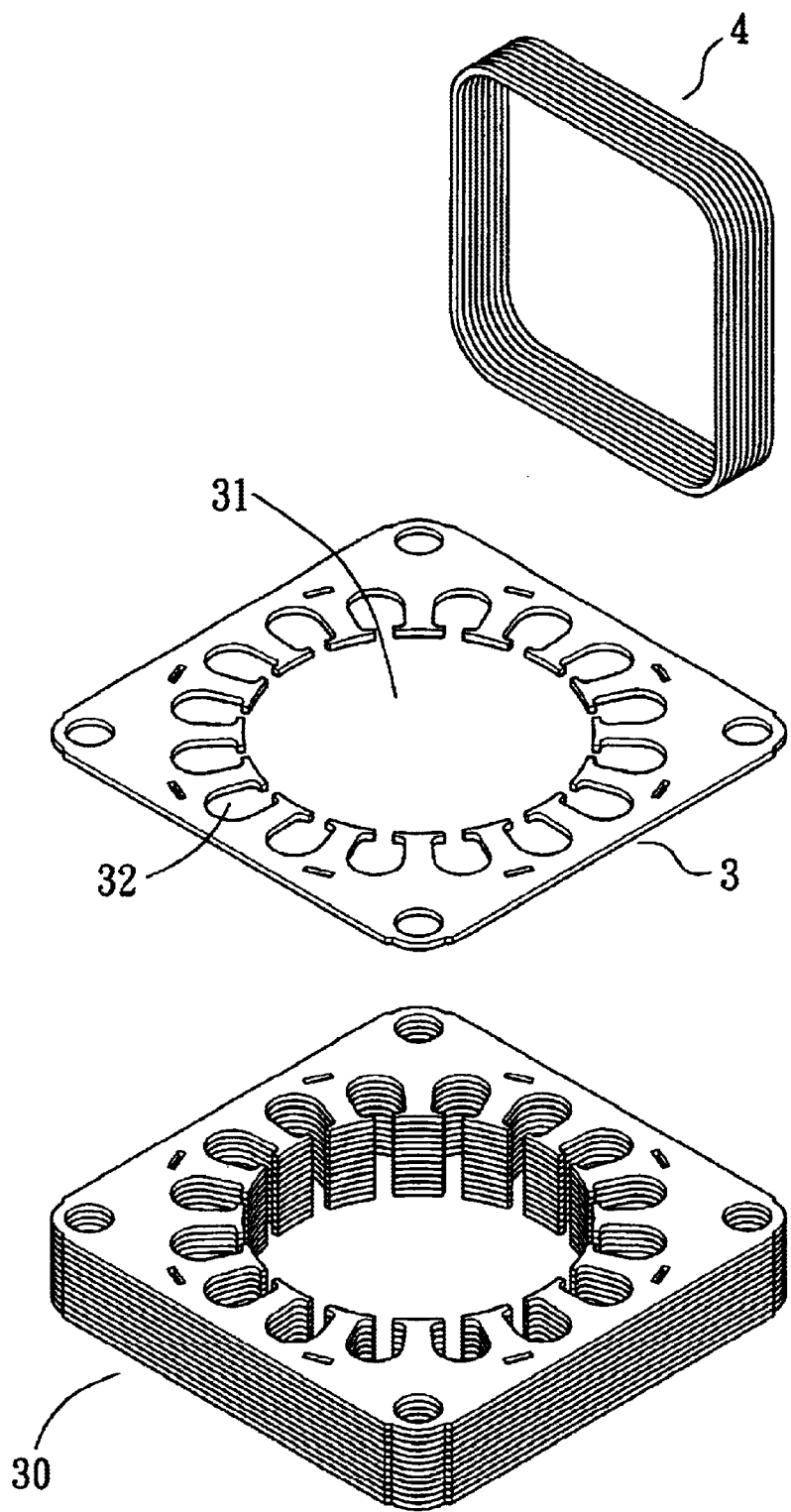
FIG. 1 is an exploded perspective view of a conventional motor stator for a home electrical fan.
Figure 2:
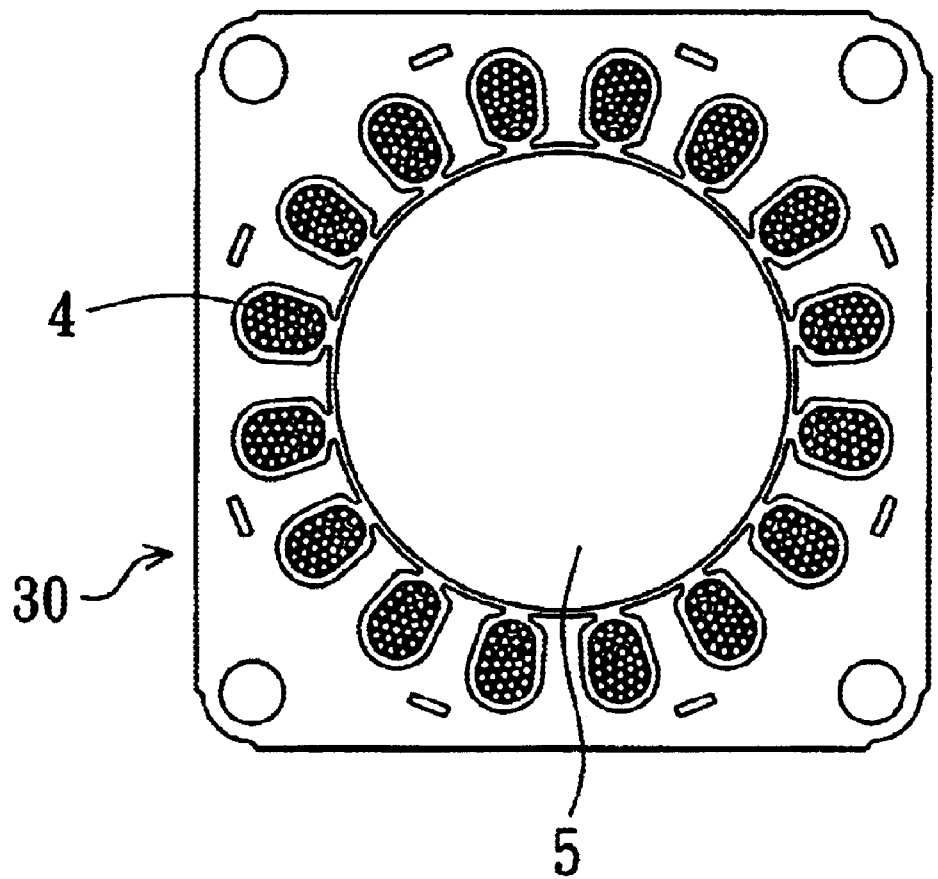
FIG. 2 is an upper view of the conventional motor stator combined with a rotor.
Figure 3:
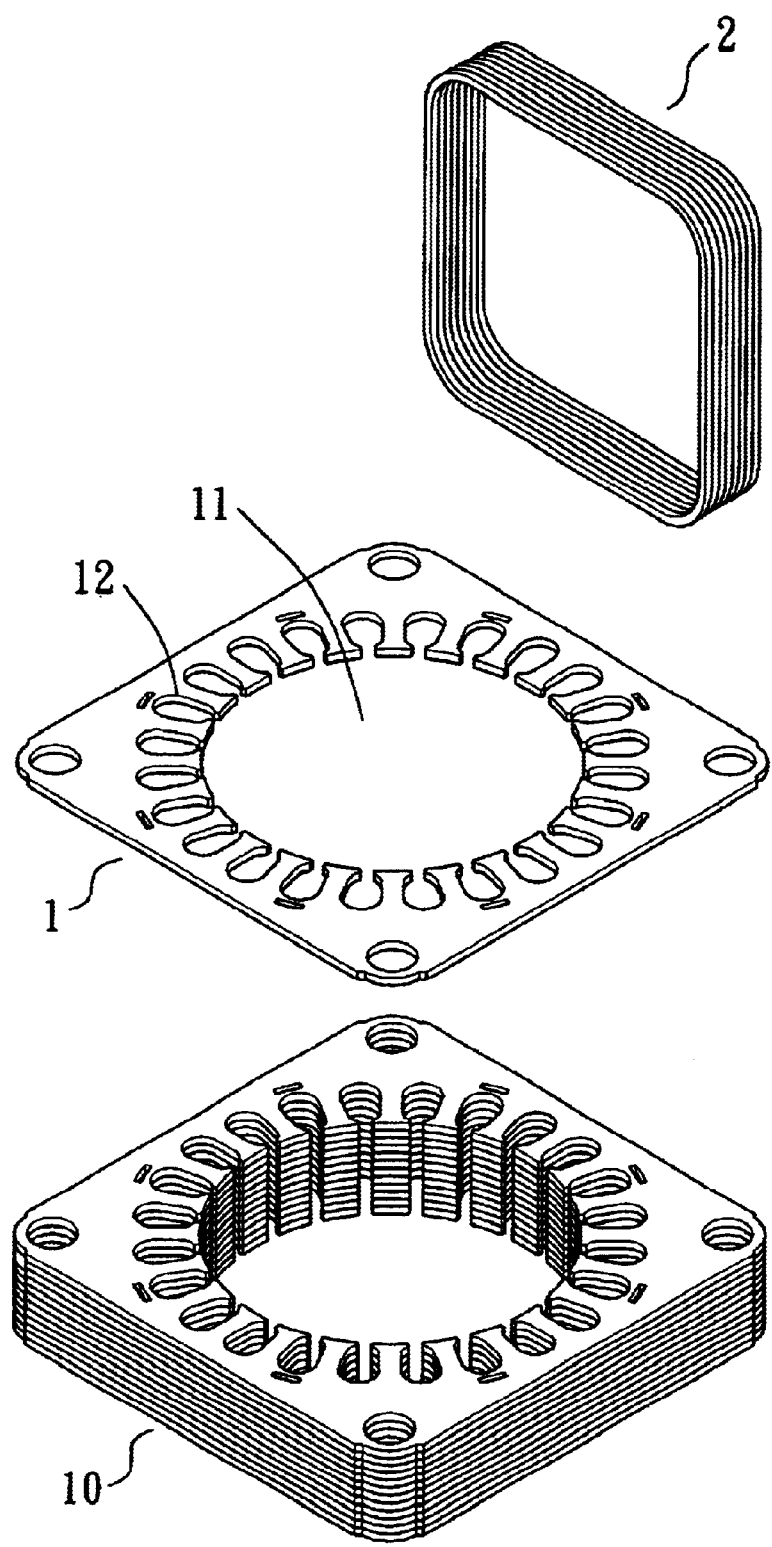
FIG. 3 is an exploded perspective view of a motor stator for a home electrical fan in the present invention; and, FIG. 4 is an upper view of the motor stator combined with a rotor in the present invention.
Figure 4:
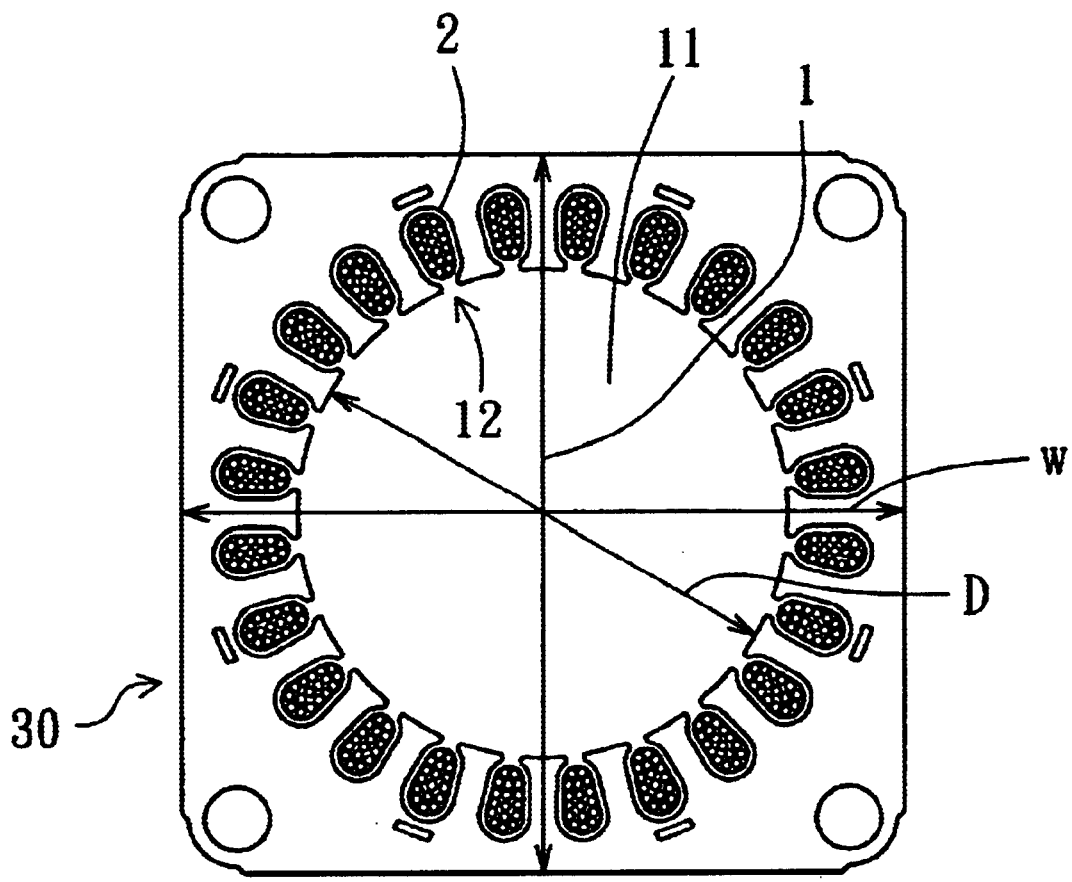

A preferred embodiment of a motor stator for a home electric fan in the present invention, as shown in FIG. 3, includes a stator 10 and a group of coils 2. The stator 10 consists of a plurality of silicon steel sheets I laminated, with a center hole 11 formed in the silicon steel sheets 1, and with 24 coil grooves 12 formed spaced apart around the center hole 11 for the coils 2 wound around each projections defined by every two coil grooves 12 for forming a motor stator of 6 poles.

The rotating torque of the motor and an outer diameter of the rotor (or the center hole 11 of the silicon steel sheets 1) makes up a proportional rate, therefore this motor stator increases the diameter of the center hole 11 for fitting a rotor 5 with a larger diameter than the conventional one, increasing the number of the coil grooves 12. Thus the motor may have a larger torque output. At the same time, the depth of the coil grooves 12 of the silicon steel sheets 1 is reduced and consequently the rings of each coil 2 also reduced, effectively lessening the needed quantity of copper and then the cost as well.

Depended on the theoretical calculation and realistic tests, the silicon steel sheets 1 of the size (l,w) 75×75 mm+or −1 mm is the most preferable for the best performance. The center hole is characterized by having a diameter (D) of 50 mm + or −1 mm, said coils after being wound forming a stator of six poles.

While the preferred embodiment of the invention has been described above, it will be recognized an understood that various modifications may be made therein and the appended claims are intended to cover all such modifications that may fall within the spirit and scope of the invention.

What is claimed is:

1. A motor stator for a home electric fan comprising a plurality of laminated silicon steel sheets of the size (l,w) of 75 mm×75 mm + or − 1 mm, each said silicon steel sheet having a center hold for a rotor, a plurality of coil grooves provided to be spaced apart around said center hold for plural coils to be wound around a projection defined by every two coil grooves; and, characterized by said center hold having a diameter (D) of 50 mm + or − 1 mm, said coils after wound forming a stator of six poles.

2. The motor stator for a home electric fan as claimed in claim 1, wherein 24 coil grooves are formed spaced apart around said center hole of each said silicon steel sheet.

\* \* \* \* \*